(12) United States Patent
Roth

(10) Patent No.: US 6,635,096 B1
(45) Date of Patent: Oct. 21, 2003

(54) METHOD FOR OPTIMIZING THE OPERATING CONDITIONS OF A SUBMERGED ARC FURNACE

(75) Inventor: Jean-Luc Roth, Thionville (FR)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 10/019,412

(22) PCT Filed: Jun. 22, 2000

(86) PCT No.: PCT/EP00/05788

§ 371 (c)(1),
(2), (4) Date: Apr. 1, 2002

(87) PCT Pub. No.: WO01/00886

PCT Pub. Date: Jan. 4, 2001

(30) Foreign Application Priority Data

Jun. 25, 1999 (LU) .................................. 90409

(51) Int. Cl.$^7$ .............................................. C21B 11/10

(52) U.S. Cl. ...................... 75/10.4; 75/10.41; 75/10.42; 75/10.61; 75/10.62; 75/10.63

(58) Field of Search ........................... 75/10.62, 10.63, 75/10.4, 10.41, 10.42, 10.61

(56) References Cited

U.S. PATENT DOCUMENTS

| 4,113,468 A | * | 9/1978 | Gudenau et al. ........... 75/10.47 |
| 4,362,556 A | * | 12/1982 | Kishida .................... 75/10.42 |
| 4,504,308 A |   | 3/1985 | Rinesch |
| 5,279,639 A | * | 1/1994 | Kemeny et al. .............. 75/301 |
| 5,611,838 A | * | 3/1997 | Fritz et al. ................. 75/10.38 |

FOREIGN PATENT DOCUMENTS

| EP | 0 637 634 A1 | 2/1995 |
| JP | 55089414 | 7/1980 |

* cited by examiner

*Primary Examiner*—Melvyn Andrews
(74) *Attorney, Agent, or Firm*—McCormick, Paulding & Huber LLP

(57) ABSTRACT

A method for producing molten metal by the reduction and melting of raw materials in a submerged arc type electric furnace includes at least one electrode, where substantial amounts of slag are generated so that the electric furnace contains a bath of molten metal covered with a thick layer of molten slag having a mass per unit area of at least 1000 kg/m$^2$. The thick layer of molten slag is made to foam locally around the at least one electrode so as to create around the electrode a local layer of foaming slag in which the density of the slag is at least 50 per cent lower than in the rest of the electric furnace.

13 Claims, 1 Drawing Sheet

METHOD FOR OPTIMIZING THE OPERATING CONDITIONS OF A SUBMERGED ARC FURNACE

FIELD OF THE INVENTION

The present invention relates to a method of optimising the functioning of a submerged arc furnace for producing molten metal.

BACKGROUND OF THE INVENTION

It is known how to use submerged arc furnaces (SAFs) for the production of ferro-alloys (Fe—Mn, Fe—Cr, etc.) and pig irons by the reduction and melting of charges of already partially pre-reduced ore, particularly by using coke as a reducing agent. It is also known how to use these SAFs for the reduction and melting of metallic residuary products, particularly metal powders which are charged in the form of fines, granules or pellets. The reduction and melting methods used in these SAFs are generally distinguished by a considerable production of slag; the mass of slag is often comparable with or even greater than the mass of metal. The bath of metal is consequently covered by a layer of molten slag of considerable depth (about 0.4 m to 1.50 m), which represents a charge of about 1 to 3.75 tonnes of slag per square metre of the bath. The electrodes of the SAF are located in the central zone of the furnace, while the charge is loaded into the peripheral zone, i.e. between the central zone with the electrodes and the furnace wall.

In the SAF, the heat energy required for melting the metallic products is generated by the conduction of the current through the molten slag. Consequently, there is no actual plasma arc (or free arc) set up between the electrodes and the bath of metal. The electrical power developed in an SAF is therefore only from 0.2 to 0.5 MW per $m^2$ of crucible surface area, which is a very low power compared with one of about 2 MW per $m^2$ of crucible surface area developed in free arc furnaces. Since the energy requirements for the reduction and melting of ferro-alloys or metallic residuary products are, on the contrary, very high, the result is that the productivity of SAFs currently leaves a lot to be desired.

Problem Underlying the Invention

It is therefore an object of the present invention to increase the productivity of a SAF.

SUMMARY OF THE INVENTION

The method according to the invention makes it possible to optimise the functioning of a submerged arc furnace for the production of molten metal. This electric furnace incorporates at least one electrode and contains a bath of molten metal covered with a thick layer of molten slag having a mass per unit area of at least 1 $t/m^2$. According to an important aspect of the invention, the slag is made to foam locally around the electrode so as to create around this electrode a local layer of foaming slag in which the density of the slag is at least 50 per cent lower than in the rest of the furnace. If the furnace has several electrodes, the slag is preferably made to foam locally around all the electrodes in the furnace.

The method according to the invention offers the possibility of optimising the functioning of an electric SAF containing a large amount of molten slag, and particularly of increasing its productivity. In effect, the creation of a local layer of foaming slag changes the way in which the electric energy passes into the bath. Conduction of the electric current through the resistive molten slag is at least partially replaced by a "plasma" arc formed in a gaseous medium, even if this medium also includes a certain proportion of molten slag. It is possible in this way to improve the characteristics of the arc, i.e. the arc voltage and the length of the arc. The electric field in plasma mode immersed in a foaming slag is at least two to four times larger than in the resistive mode (conduction in the molten slag). As a result, there is an appreciable increase in the power of the SAF. Since the power is higher, it is possible to reduce the melting time and hence increase the productivity. Besides, the conditions for the production of molten metal in foaming slag are less severe than in molten slag. That is the reason for the lower consumption of the electrode or electrodes in the local layer of foaming slag.

The electric furnace may contain a bath of molten metal covered with a thick layer of molten slag having a thickness from 0.4 to 1.5 m. Preferably, the local layer of foaming slag surrounding the electrode comprises at least 50 per cent of gas, and optimally at least 80 per cent of gas.

Advantageously, the local layer of foaming slag is formed by the addition of at least one carbon-containing fuel and/or at least one oxidant, in or on said layer of slag and/or said bath of molten metal. The reaction of the carbon-containing fuel with the oxygen contained in the bath of molten metal produces CO, which causes the slag to foam. In addition, the combustion of the carbon-containing fuel provides an input of energy which is then added to the heat energy of electrical origin for the reduction and the melting. By injecting the gas containing oxygen into the top third of the layer of slag, post-combustion of the CO can be achieved, i.e. a reaction which also contributes to the input of heat energy.

According to a preferred mode of execution, the electric furnace comprises at least three electrodes located in the centre of the furnace. A local layer of foaming slag is then created between the three electrodes. In other words, the local layer of foaming slag surrounds each electrode and extends between the electrodes at the centre of the furnace.

Preferably, the raw materials are added mainly at the centre of the electric furnace.

According to a first mode of execution, the raw materials are added in the form of fines injected into the lower part of the layer of slag and/or into the bath of molten metal. It is, for example, possible to use this method to inject fines of pre-reduced iron ore.

According to a second mode of execution, the raw materials are added in the form of pellets or bricks. This makes it possible to introduce into the electric furnace raw materials that cannot be injected, by agglomerating them for example into pellets or bricks with a high enough density to penetrate the layer of slag.

BRIEF DESCRIPTION OF THE DRAWINGS

Other special features and characteristics of the invention will emerge from the detailed description of an advantageous mode of execution given below, as an illustrative example, making reference to the appended drawing. This shows:

DETAILED DESCRIPTION OF THE PREFERRED EMBODIMENTS

Figure 1:
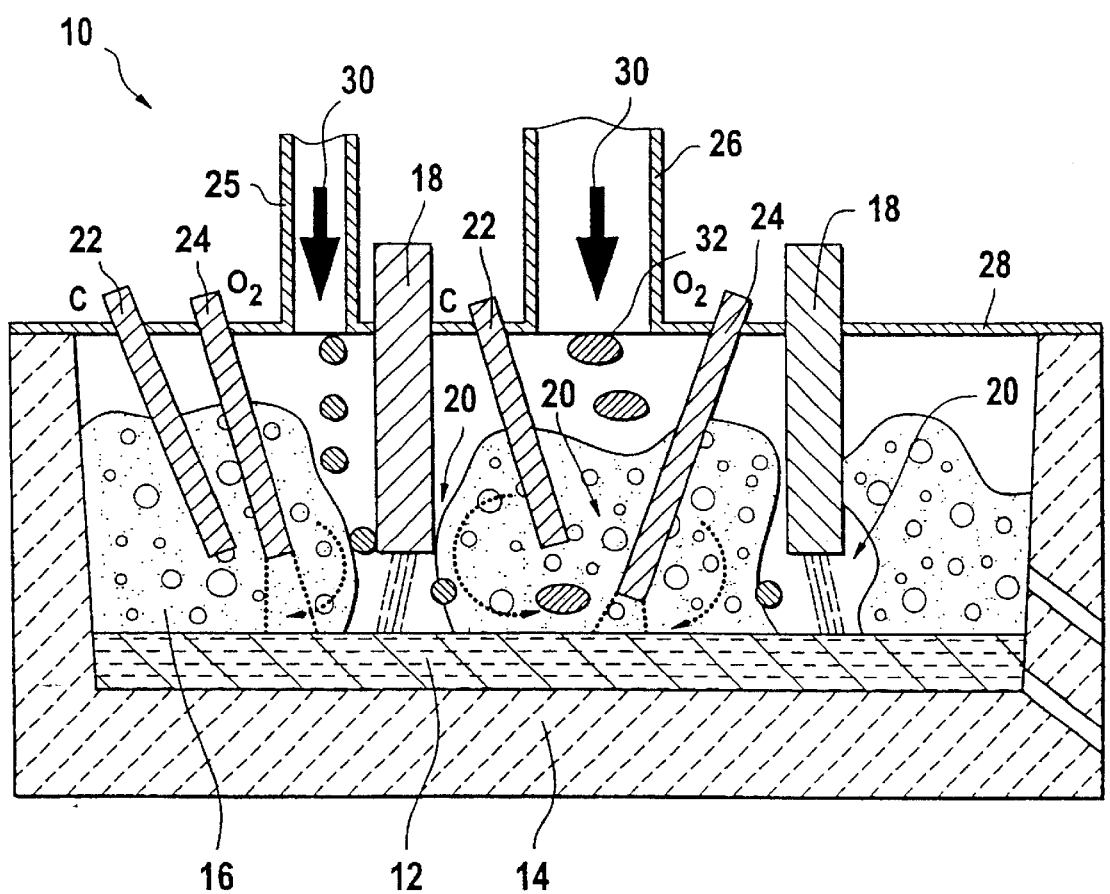

FIG. 1: a cross-sectional view of a submerged arc furnace in which the method according to the invention is carried out.

FIG. 1 represents a cross-sectional view of an electric furnace 10 of the submerged arc type (SAF: Submerged Arc Furnace). A bath of molten metal 12 is received on to the hearth 14 of the furnace. A thick layer of molten slag 16 lies above the bath of metal. This layer of molten slag may reach heights exceeding 1.5 m. It represents a charge of about 1 to 3.75 tonnes per square metre of the bath of metal. Several electrodes 18 are placed at the centre of the furnace, two of which are visible in FIG. 1. The bottom end of these electrodes is located well below the normal level of the slag in the hearth 14.

It should be appreciated that the layer of molten slag 16 around the electrodes 18 is made to foam, so as to create a local layer of foaming slag 20 in which the density of the slag is at least 50 per cent lower than in the rest of the electric furnace. When the furnace has three electrodes, they are generally placed in a triangle at the centre of the furnace. The local layer of foaming slag is then formed so that it extends between the three electrodes and surrounds each of them. The local layer of foaming slag alters the way the electric current passes through the bath and the slag. It should be noted that the electrodes in this case are placed in a triangle, but they could also be in a straight line. In addition, the furnace could have more than three electrodes.

When the electrodes are surrounded by molten slag, the input of electrical energy is achieved by conduction. By creating a local layer of foaming slag around the electrodes, it is possible to form "plasma" arcs in a quasi-gaseous medium, which improves the characteristics of the arc. An electric field that would be 0.1 V/mm in resistive mode (conduction through the molten slag) may be increased to 0.5 V/mm in plasma arc mode in the local layer of foaming slag.

It should be pointed out that the method of the present invention is well suited to the production of molten metal from raw materials generating a lot of slag, for example, iron ore that is pre-reduced to a certain extent and metallic residuary products. Even with layers of molten slag with thicknesses of up to 1.5 m, it is possible to cause the slag to foam locally in the region of the electrodes. In this way, it is possible to take advantage of the conditions in which foaming slag is produced without any risk of overflowing.

In order to create the local layer of foaming slag, carbon and oxygen for example may be added to the bottom layer of the slag and/or to the bath of molten metal. FIG. 1 shows, for example, a lance 22 which is injecting a jet of solid carbon-containing pulverised material into the bottom third of the layer of slag 16. The flow per unit time of solid carbon-containing pulverised material through the lance 22 is from 10 to 30 kg/min, keeping to a flow rate per unit area from 0.5 to 5 kg/min.m$^2$, preferably 1 kg/min.m$^2$. It is also possible to inject a primary jet of oxygen using a lance 24 into the bottom third of the layer of slag 16. The flow rate of the oxygen is preferably proportional to the flow rate of the carbon, at a rate between 1 and 2 m$^3$/kg. This primary jet of oxygen is intended to produce CO in accordance with the following reactions:

$$C_{(metal\ bath)} + \tfrac{1}{2}O_2 \rightarrow CO$$

and $$Fe_{(metal\ bath)} + \tfrac{1}{2}O_2 \rightarrow FeO,$$

followed by $$FeO + C_{(injected)} \rightarrow Fe + CO$$

A secondary jet of oxygen may be injected into the top third of the slag 16 (not represented), in order to burn the CO:

$$CO + \tfrac{1}{2}O_2 \rightarrow CO_2$$

This post-combustion of CO releases a larger amount of energy than the combustion of C to CO.

It should be noted that the amount of oxygen injected is adjusted according to the amount of reducible oxides contained in the raw materials (metallic products to be reduced and melted). If the raw materials contain large amounts of oxides, for example FeO or NiO, the amount of oxygen injected to create the foaming slag can be reduced or even eliminated.

It is clear that the carbon added to create the foaming slag must be injected in addition to that necessary for the reduction of the charge and the decarburising of the metal.

Depending on the amounts of oxygen and carbon introduced into, and contained in, the bath 12, it is therefore possible to vary the proportion of gas in the layer of foaming slag 20. Care should be taken to ensure that a layer of foaming slag 20 is formed containing at least 50 per cent of gas, and preferably more than 80 per cent of gas.

The reference numbers 25 and 26 indicate a peripheral and central opening respectively in the roof 28 of the furnace 10 for the introduction of the raw materials.

The raw materials in the form of fines or granules are preferably injected in the bottom layer of the slag and/or at the interface (not represented) between the bath and the slag.

Raw materials incapable of being injected are agglomerated in the form of bricks or pellets and are introduced preferably through the central opening 26. The bricks and pellets are fabricated so that their mass enables them to penetrate the layer of slag and so that they can break up easily.

In FIG. 1, the arrows 30 indicate the introduction into the furnace 10 of pellets 32 through the peripheral openings 25 and the central opening 26.

Quantitative Theoretical Example

An existing SAF with a crucible diameter of 3.5 m (surface area of crucible ≈10 m$^2$) develops a power of 3 MW. For the reduction and melting of a charge of 1 tonne, an energy of 1500 kWh is required. When the SAF is operated conventionally (i.e. with a molten slag surrounding the electrodes), the electrical-to-thermal energy efficiency is about 0.7 and the "raw" productivity (excluding casting time and downtime) is $$3000(kW) \times 0.7/1500(kWh/t) \approx 1.4 t/h.$$

The injection near the electrodes of 10 kg/min of carbon with an energy content of 9 kWh/kg amounts to an input of $$10 \times 9 \times 60 = 5400\ kW.$$

By transferring energy from the carbon with an efficiency of 40 per cent, the productivity increases to $$((3000 \times 0.7) + (5400 \times 0.4))/1500 \approx 2.8 t/h.$$

In addition, the release of CO near the electrodes forms a local layer of foaming slag surrounding the electrodes and hence promotes the establishment of a plasma arc. By boosting the electrical supply to the electrodes (change of transformer, with the same maximum current), the arc voltage may be doubled. The electrical power developed thus changes to 6 MW. By assuming that, to a first approximation, the electric-to-thermal energy efficiency is unchanged, the productivity of the furnace is potentially increased to $$((6000 \times 0.7) + (5400 \times 0.4))/1500 \approx 4.2 t/h.$$

A calculation of the various consumptions enables some idea of the profitability of the method to be obtained. For the oxygen requirements, a rate of 1.5 m$^3$ of $O_2$ per kg of carbon is estimated.

In conventional functioning, the consumption is:

$$3000/1.4 = 2143 \text{ kWh/t}.$$

By considering the input of energy from the solid carbon-containing pulverised material, the consumption is:

electrical energy: 3000/2.8=1071 kWh carbon: (10×60)/2.8=214 kg/t oxygen: 214×1.5=321 m$^3$/t.

When functioning with the input of energy from the solid carbon-containing pulverised material and the plasma arc, the consumption is:

electrical energy: 6000/4.2=1428 kWh carbon: (10×60)/4.2=143 kg/t oxygen: 143×1.5=214 m$^3$/t.

As these calculations show, 1 kg of C and 1.5 m$^3$ of $O_2$ are substituted for 5 kWh of electrical energy. This substitution hardly causes any additional running costs. However, the increase in productivity (from 1.4 to 4.2 t/h) is such that the method proves to be very profitable.

What is claimed is:

1. A method of producing molten metal by reduction and melting of raw materials in a submerged arc electric furnace comprising at least one electrode, said method generating substantial amounts of slag, so that said electric furnace contains a bath of molten metal covered with a thick layer of molten slag having a mass per unit area of at least 1000 kg/m$^2$, wherein said thick layer of molten slag is made to foam locally around said at least one electrode so as to create around this electrode a local layer of foaming slag in which the density of the foaming slag is at least 50 per cent lower than in the rest of said electric furnace.

2. The method according to claim 1, wherein said electric furnace contains a bath of molten metal covered with a thick layer of molten slag having a thickness from 0.4 to 1.5 m.

3. The method according to claim 1, wherein said local layer of foaming slag comprises at least 50 per cent of gas.

4. The method according to claim 1, wherein said local layer of foaming slag is formed by the addition of at least one of a carbon-containing fuel and an oxidant, in at least one of said layer of slag and said bath of molten metal.

5. The method according to claim 1, wherein raw materials are added mainly at the center of said electric furnace.

6. A method of producing molten metal by reduction and melting of raw materials in a submerged arc electric furnace comprising at least one electrode, said method generating substantial amounts of slag, so that said electric furnace contains a bath of molten metal covered with a thick layer of molten slag having a mass per unit area of at least 1000 kg/m$^2$, wherein:

said thick layer of molten slag is made to foam locally around said at least one electrode by injecting a solid carbon-containing pulverized material into a lower third of said layer of molten slag so as to create around this electrode a local layer of foaming slag in which the density of the foaming slag is at least 50 per cent lower than in the rest of said electric furnace.

7. The method according to claim 6, wherein a gas containing oxygen is injected into the top third of said layer of molten slag.

8. The method according to claim 7, wherein said electric furnace comprises at least three electrodes at its center and said local layer of foaming slag is created between said three electrodes.

9. The method according to claim 8, wherein raw materials are added mainly at the. centre of said electric furnace.

10. The method according to claim 9, wherein raw materials are added in the form of fines injected into one of the lower part of said layer of slag and said bath of molten metal.

11. The method according to claim 9, wherein raw materials are added in the form of pellets or bricks.

12. A method of producing molten metal by reduction and melting of raw materials in a submerged arc electric furnace comprising at least one electrode, said method generating substantial amounts of slag, so that said electric furnace contains a bath of molten metal covered with a thick layer of molten slag having a mass per unit area of at least 1000 kg/m2, wherein:

said thick layer of molten slag is made to foam locally around said at least one electrode so as to create around this electrode a local layer of foaming slag in which the density of the foaming slag is at least 50 per cent lower then in the rest of said electric furnace; and said raw materials are added in the form of fines injected into one of the lower part of said layer of slag or said bath of molten metal.

13. A method of producing molten metal by reduction and melting of raw materials in a submerged arc electric furnace comprising at least one electrode, said method generating substantial amounts of slag, so that said electric furnace contains a bath of molten metal covered with a thick layer of molten slag having a mass per unit area of at least 1000 kg/m2, wherein:

said thick layer of molten slag is made to foam locally around said at least one electrode so as to create around this electrode a local layer of foaming slag in which the density of the foaming slag is at least 50 per cent lower than in the rest of said electric furnace; and said raw materials are added in the form of pellets or bricks mainly at the centre of said submerged arc electric furnace.

* * * * *